US008482758B2

(12) United States Patent
Onno et al.

(10) Patent No.: US 8,482,758 B2
(45) Date of Patent: Jul. 9, 2013

(54) METHOD AND DEVICE FOR PROCESSING A SEQUENCE OF DIGITAL IMAGES WITH A SCALABLE FORMAT

(75) Inventors: Patrice Onno, Rennes (FR); Fabrice Le Leannec, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 1080 days.

(21) Appl. No.: 11/655,804

(22) Filed: Jan. 19, 2007

(65) Prior Publication Data

US 2007/0223033 A1 Sep. 27, 2007

(30) Foreign Application Priority Data

Jan. 19, 2006 (FR) ..................................... 06 50194

(51) Int. Cl.
*G06F 3/12* (2006.01)
*G06K 15/00* (2006.01)
*G06K 9/36* (2006.01)

(52) U.S. Cl.
USPC .......... 358/1.15; 358/1.16; 382/232; 382/240

(58) Field of Classification Search
None
See application file for complete search history.

(56) References Cited

U.S. PATENT DOCUMENTS

| | | | | |
|---|---|---|---|---|
| 5,418,570 | A * | 5/1995 | Ueno et al. | 375/240.14 |
| 6,501,860 | B1 | 12/2002 | Charrier et al. | 382/240 |
| 6,891,895 | B1 | 5/2005 | Onno et al. | 375/260 |
| 7,113,643 | B2 | 9/2006 | Le Leannec et al. | 382/235 |
| 7,190,838 | B2 | 3/2007 | Le Leannec et al. | 382/233 |
| 7,212,678 | B2 | 5/2007 | Brown et al. | 382/240 |
| 7,215,819 | B2 | 5/2007 | Onno et al. | 382/240 |
| 7,260,264 | B2 | 8/2007 | Guillou et al. | 382/232 |
| 2002/0048319 | A1 | 4/2002 | Onno | 375/240 |
| 2002/0150164 | A1 * | 10/2002 | Felts et al. | 375/240.19 |
| 2003/0174897 | A1 | 9/2003 | Le Leannec et al. | 382/240 |
| 2003/0215146 | A1 * | 11/2003 | Schwartz et al. | 382/232 |
| 2004/0012820 | A1 | 1/2004 | Donescu et al. | 358/3.28 |
| 2004/0042486 | A1 | 3/2004 | Onno et al. | 370/466 |
| 2004/0068587 | A1 | 4/2004 | Le Leannec et al. | 709/247 |
| 2005/0069212 | A1 * | 3/2005 | Bottreau et al. | 382/240 |
| 2005/0117640 | A1 * | 6/2005 | Han | 375/240.03 |
| 2005/0147164 | A1 * | 7/2005 | Wu et al. | 375/240.12 |
| 2006/0133497 | A1 * | 6/2006 | Park et al. | 375/240.16 |

(Continued)

FOREIGN PATENT DOCUMENTS

WO WO 01/06794 1/2001
WO WO 2004/004355 1/2004

OTHER PUBLICATIONS

Ohm, J-R., "Complexity and Delay Analysis of MCTF Interframe Wavelet Structures", ISO/IEC JTC1/SC29/WG11 MPEG02/M8520, Jul. 2002, pp. 1-16.

(Continued)

*Primary Examiner* — Vincent Rudolph
(74) *Attorney, Agent, or Firm* — Fitzpatrick, Cella, Harper & Scinto

(57) ABSTRACT

The method of processing a sequence of digital images, in the context of coding according to a bit stream comprising compressed output images organized according to at least two temporal hierarchy levels in accordance with a predetermined scalable format, comprises the following steps:
  obtaining and storing original images, and
  generating output images, by the transformation of original images and/or intermediate images, and/or output images, in a first chosen order so that the number of images to be stored, simultaneously necessary for the transformation of the original images into output images, is minimal.

15 Claims, 7 Drawing Sheets

U.S. PATENT DOCUMENTS

| | | | |
|---|---|---|---|
| 2006/0177139 A1* | 8/2006 | Marcellin et al. | 382/232 |
| 2006/0262856 A1* | 11/2006 | Wu et al. | 375/240.19 |
| 2006/0274958 A1* | 12/2006 | Lopez et al. | 382/240 |
| 2006/0291564 A1* | 12/2006 | Marquant et al. | 375/240.19 |
| 2007/0019721 A1 | 1/2007 | Le Leannec et al. | 375/240.1 |
| 2007/0216699 A1 | 9/2007 | Le Leannec et al. | 345/555 |
| 2008/0075170 A1 | 3/2008 | Henocq et al. | 375/240.16 |
| 2008/0130736 A1 | 6/2008 | Onno et al. | 375/240.01 |

OTHER PUBLICATIONS

Pau, G. et al., "Delay-Performance Trade-Offs in Motion-Compensated Scalable Subband Video Compression", Proceedings of ACIVS: Advanced Concepts for Intelligent Vision Systems, pp. 1-5, Sep. 2004.

Mrak, M., et al., "An Overview of Basic Techniques Behind Scalable Video Coding", Electronics in Marine, 2004., Proceedings Elmar 2004. 46$^{th}$ International Symposium, Zadar, Croatia, Jun. 16-18, 2004,pp. 597-602.

Bottreau V., et al, "A Fully Scalable 3D Subband Video Codec", Proceedings IEEE International Conference on Image Processing (ICIP) 2001, Thessaloniki, GR, 2001, vol. 2 of 3, Conf. 8, Oct. 7, 2001, pp. 1017-1020.

De Greef E et al.: "Memory Size Reduction Through Storage Order Optimization for Embedded Parallel Multimedia Applications", Parallel Computing, Elsevier Publishers, Amsterdam, NL, vol. 23, No. 12, Dec. 1, 1997, pp. 1811-1837.

* cited by examiner

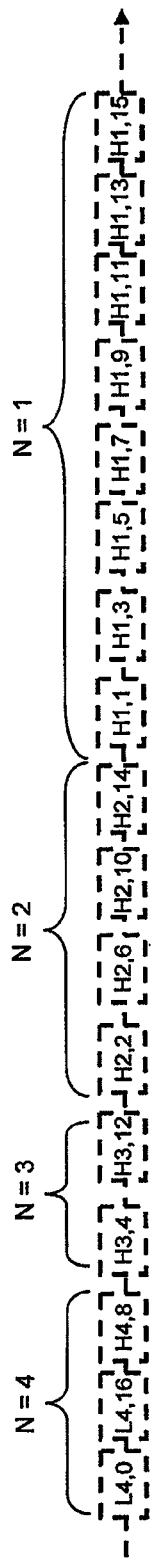
Fig. 4A – Prior art
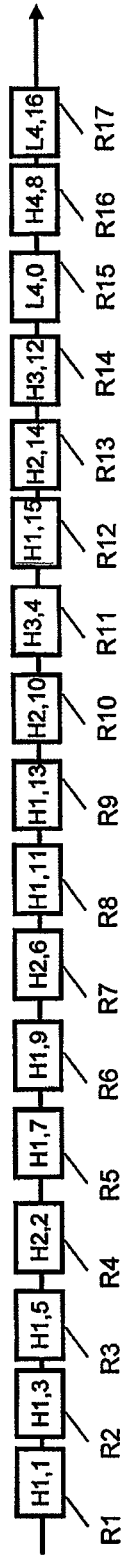
Fig. 4B

METHOD AND DEVICE FOR PROCESSING A SEQUENCE OF DIGITAL IMAGES WITH A SCALABLE FORMAT

FIELD OF DISCLOSURE

The present invention relates to the processing of a compressed sequence of digital images according to an extensible format also referred to as "scalable" and more particularly to the reduction in the processing time for such a video sequence according to such an extensible format, as well as to the reduction of the memory size used in the context of the coding of such a video sequence according to such an extensible format.

BACKGROUND

The property of a video sequence of the extensible format is to be able, from a single bit stream, to extract and decode videos according to different characteristics in terms of quality, time frequency and/or image size.

The future SVC standard (Scalable Video Coding) describes the process of coding video sequences in order to represent them in a scalable format. In practice, the SVC standard has been developed by the JVT (Joint Video Team) group, which brings together the experts in video compression from the MPEG (Moving Picture Expert Group) of the ISO/IEC and the video experts from the ITU, the International Telecommunications Union. This future SVC standard is an amendment to the video compression standard H.264 intended to offer more extensibility, or "scalability", to the digital images of a video sequence.

More precisely, the SVC standard provides a compressed representation for supporting extensibility (scalability) along three different axes: temporal scalability, spatial scalability, and quality scalability.

In practice, the new SVC video format makes it possible to be decoded in a different manner according to the capacities and possibilities of the decoder and the characteristics of the network. Thus, from a video of average resolution (for example, with a resolution of 704×576 pixels, at a frequency of 60 Hz), it is possible to decode a bit stream corresponding to that of a mobile telephone (for example, with a resolution of 176×144 pixels, at a frequency of 15 Hz). Likewise, from an image with a given size and a given time frequency, it is possible to decode a video sequence by selecting the required quality according to the capacity of the network.

At the present time, the property of scalability of a video format is a property which is more and more important and extensive in the field of the processing of images in a video sequence.

However, the current methods for image processing use techniques which have the drawback of consuming processing time on the one hand and/or memory size on the other hand.

SUMMARY OF THE INVENTION

The applicant posed itself the problem of providing processing of digital images in a video sequence according to a scalable format having the advantage of reducing the memory size used and/or reducing the decoding time as soon as the images are received at the decoder.

The present invention affords precisely a solution to this problem.

It thus relates to a method of processing a sequence of digital images, in the context of a coding according to a bit stream comprising compressed output images organized according to at least two temporal hierarchy levels in accordance with a predetermined scalable format.

According to a general definition of the invention, the method comprises the following steps:
 obtaining and memorizing original images;
 generating output images, by transforming the original images and/or intermediate images and/or output images, in a first chosen order so that the number of images to be stored, simultaneously necessary for the transformation of the original images into output images, is minimal.

Such a method thus makes it possible to minimize the memory required for the processing of a group of original images at the encoder compared with the processing methods of the prior art.

In practice, the processing simultaneously intermingles images of different temporal hierarchy levels.

In practice, an output image is generated as soon as the image or images of the lower temporal hierarchy level necessary for its generation by transformation are available, which reduces the memory size and the latency time at the encoder.

According to one embodiment, the method comprises, after the generation step, a step of coding the output images.

According to another embodiment, the step of coding the output images commences before the end of the step of obtaining all of the original images of the sequence, which further reduces the latency time at the encoder.

According to yet another embodiment, the method also comprises a step of sequencing the output images in a second chosen order.

The second chosen order is preferably adapted to minimize the subsequent decoding time for the images.

According to yet another embodiment, the transformation consists of filtering operations of the temporal prediction type and/or updates.

Another object of the present invention is a method of processing a sequence of digital images, in the context of a decoding of a bit stream comprising compressed output images organized according to at least two temporal hierarchy levels in accordance with a predetermined scalable format.

According to another aspect of the invention, the method comprises the following steps:
 decoding compressed output images according to said scalable format and storing the output images thus decoded,
 generating reconstructed images of the sequence of images, by reverse transformation of decoded output images and/or intermediate images, and/or reconstructed images, processed in a third chosen order so that the number of images to be stored, simultaneously necessary for the reverse transformation of the output images into reconstructed images, is minimal.

Such a processing method thus makes it possible to minimize the memory required for processing a group of compressed output images according to a predetermined scalable format at the decoder. The third order applied for the processing depends on the order of the compressed output images at the input of the decoder.

According to one embodiment, the method of processing a sequence of digital images in the context of the decoding comprises a prior step of sequencing the compressed output images according to a fourth chosen order.

The fourth order is advantageously chosen to minimize the image decoding time. This sequencing can be effected at the decoding level on the device that carries out the coding, or by a specific processing of the file on an intermediate device, or at the time of decoding on the device that carries out the decoding. It is particularly advantageous to choose the fourth order identical to the second order mentioned above.

Preferably, the generation of reconstructed images simultaneously mingles images of different temporal hierarchy levels.

According to another embodiment, a reconstructed image is generated as soon as the image or images of the higher temporal hierarchy level necessary for its generation by reverse transformation are available, which makes it possible to reduce the latency time at the decoder.

According to yet another embodiment, the step of generating the reconstructed images commences before the end of the step of obtaining all the compressed output images in the sequence.

In practice, the bit stream is coded according to the scalable format of the SVC type.

Another object of the present invention is a processing device for implementing the processing method, on the encoder side.

According to another aspect of the invention, the processing device, on the encoder side, comprises:
  means for obtaining and storing original images, and
  means for generating output images by transforming original images and/or intermediate images and/or output images, in a first order chosen so that the number of images to be stored, simultaneously necessary for the transformation of the original images into output images, is minimal.

Another object of the present invention is a processing device for implementing the processing method, on the decoder side.

According to another aspect of the invention, the processing device, on the decoder side, comprises:
  means for decoding compressed output images according to the said scalable format and storing the output images thus decoded,
  means for generating reconstructed images of the sequence of images, by reverse transformation of decoded output images and/or intermediate images, and/or reconstructed images, processed in a third chosen order so that the number of images to be stored, simultaneously necessary for the reverse transformation of output images into reconstructed images, is minimal.

Another object of the present invention is an information medium that can be read by a computer system, possibly removable, totally or partially, in particular a CD-ROM or magnetic medium such as a hard disk or a diskette, or a transmissible medium such as an electrical or optical signal, characterized in that it comprises instructions of a computer program for implementing the method mentioned above, when this program is loaded into and executed by a computer system.

Finally, an object of the present invention is a computer program stored on an information medium, said program comprising instructions for implementing the method mentioned above, when this program is loaded into and executed by a computer system.

The present invention confers many advantages.

Firstly, the memory size can be minimized both at encoding and at decoding when various time versions of the video sequence are obtained. For example, for a group of images of size 16, 8 images may suffice from the buffer for processing/compressing the various time versions of these 16 images.

Secondly, the images in the bit stream of the video are organized so that the decoding of a group of images can start without awaiting the decoding of all the images in the said group of images.

Thus the invention makes it possible to reduce the delays between decoding and display. This reduction is in particular operational with regard to delays between the encoding and decoding caused by the processing of a group of images in real-time applications such as video conferencing or video surveillance.

The invention also makes it possible to reduce the calculative complexity found in decodings of the prior art according to which no processing is undertaken as long as the last image of the last level has not been calculated.

BRIEF DESCRIPTION OF THE DRAWINGS

Other characteristics and advantages of the invention will emerge in the light of the following detailed description and the drawings, in which:

FIGS. 4A and 4B depict schematically orders of arrangement of the video bit stream according to the prior art and according to the invention;

DETAILED DESCRIPTION OF THE DRAWINGS

Figure 1:
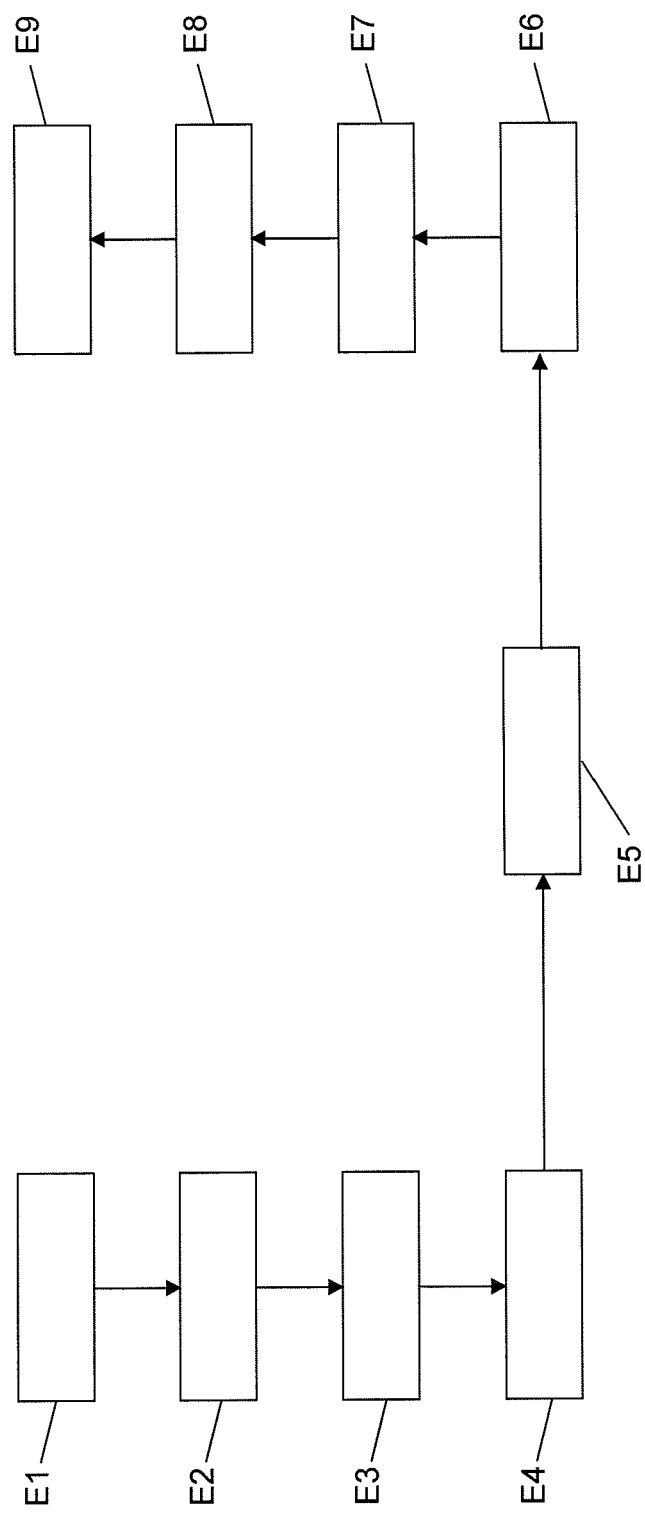
FIG. 1 depicts schematically a flow diagram illustrating the principal steps of the method according to the invention.

With reference to FIG. 1, the various steps of the method according to the invention have been described. Firstly (step E1), original images of the sequence of digital images are put in a buffer (step E2). It should be noted that it is this buffer that is minimized for processing at the encoder.

Figure 3:
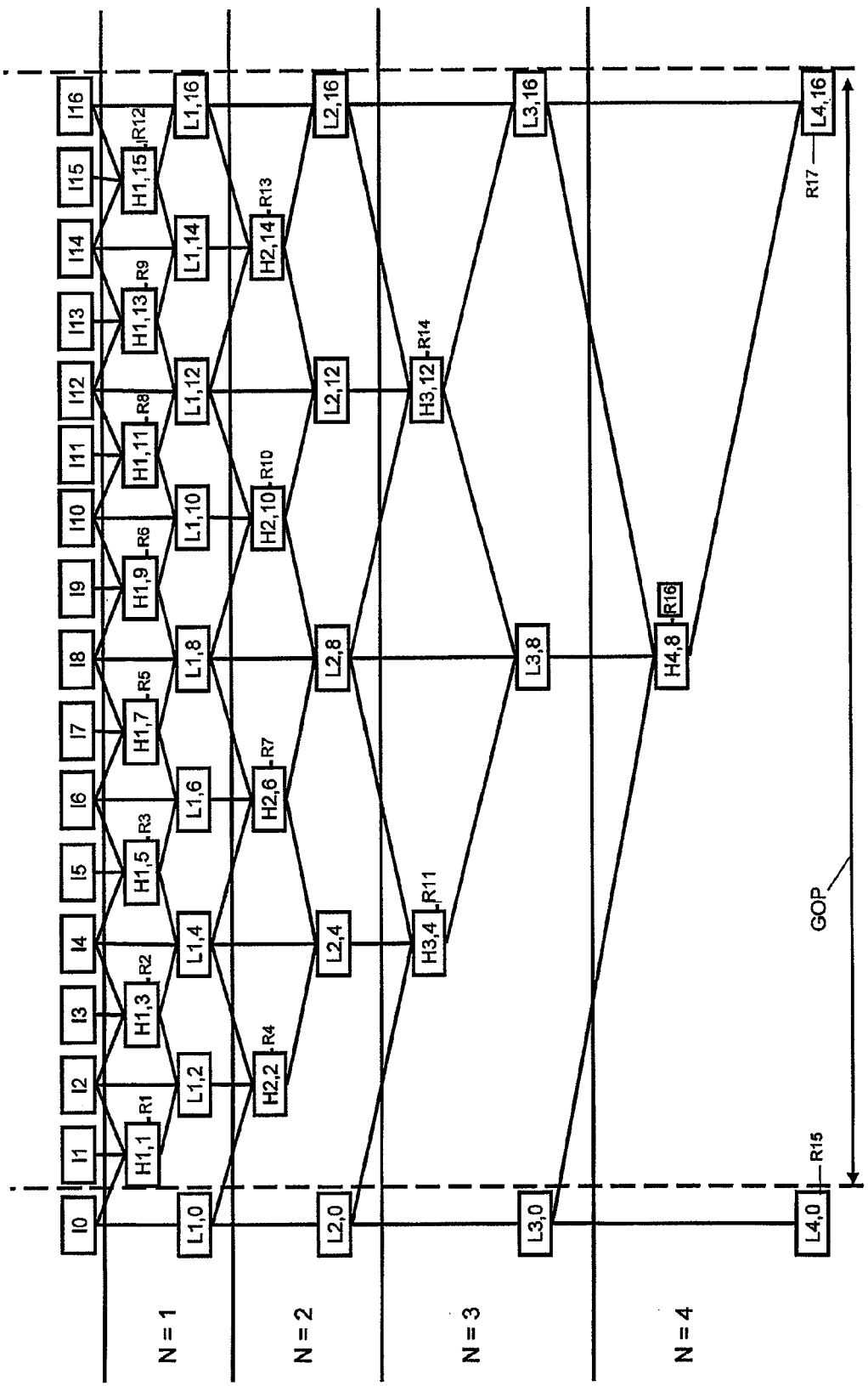
FIG. 3 depicts schematically the generation of the temporal versions for a given spatial resolution according to the technique of temporal filtering compensated for movement at the encoder.

The images of the various temporal hierarchy levels are then generated during step E3. FIG. 3, described below, gives a detailed example of the method for the generation, according to the invention, of the images of the various temporal hierarchical levels. This method uses a processing according to a first sequencing which makes it possible to minimize the number of images necessary simultaneously from the buffer. The images thus produced are then coded during step E4. The coding means are conventional and use the movement-compensation temporal filtering techniques coupled with prediction error codings widely known to persons skilled in the art. The method then consists of reorganizing the order of the images in the video bit stream during step E5, according to a second chosen order so as to minimize the processing time at the decoder. It should be noted that this step E5 can be implemented at the encoder, at the decoder or at a node in the network situated between the coder and decoder.

Step E6 then consists of carrying out the decoding of the images in the order imposed during step E5. Step E8 restores the various temporal hierarchy versions of the video sequence using a buffer (step E7). One of the methods of generating reconstructed images is described with reference to FIG. 5. During step E9, the video sequence thus obtained after decoding is displayed. On display, the user can select the time resolution that he wishes to view.

Figure 2:
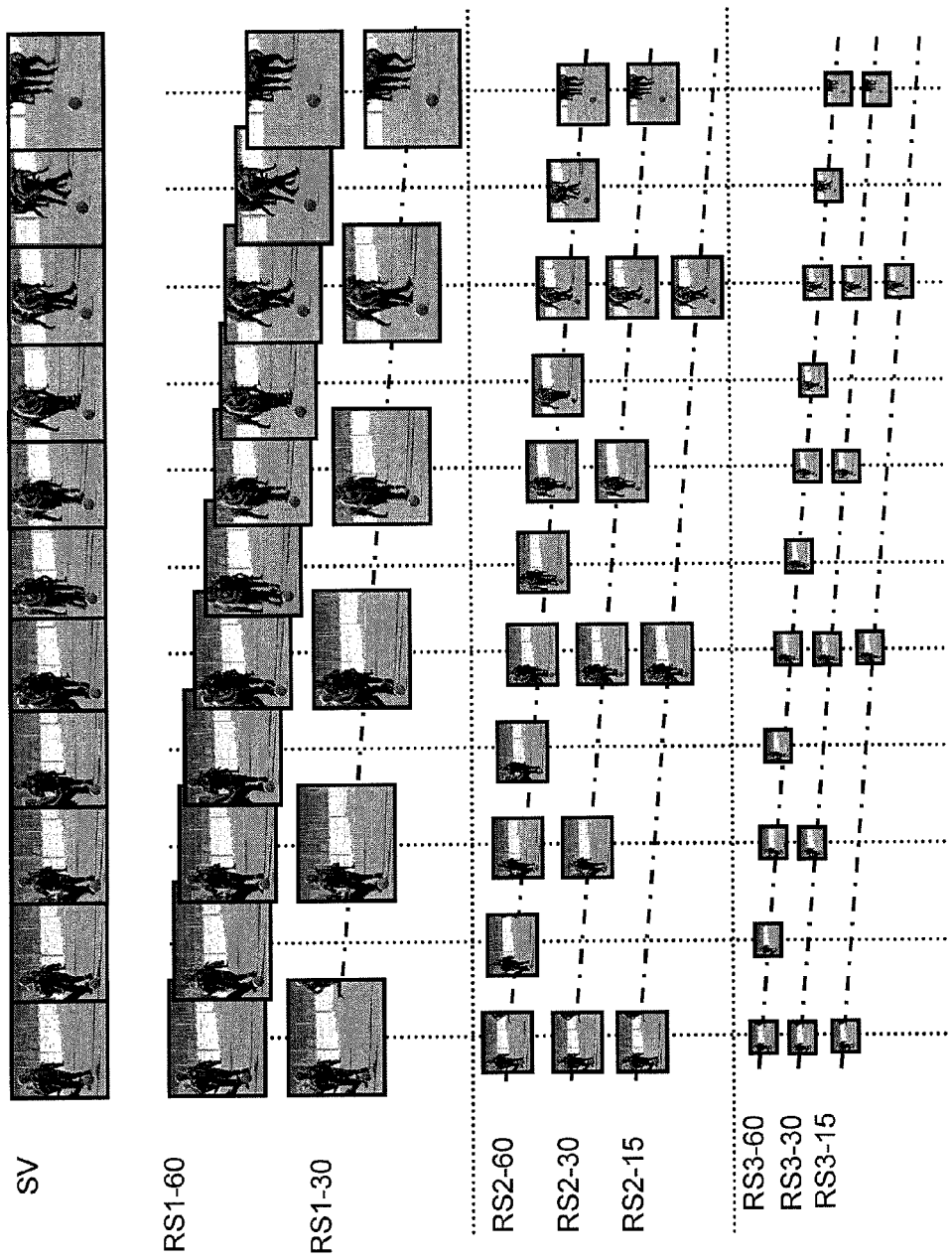
FIG. 2 depicts schematically the various temporal and spatial versions of a video sequence.

With reference to FIG. 2, various temporal and spatial hierarchy versions that can be obtained with the SVC standard have been depicted schematically.

For example, from a video sequence SV of the television format, that is to say originally composed of 60 images (704× 576 pixels) per second. It is possible to construct (and subsequently to extract) for the same spatial resolution RS1 equal to 704×576, various dyadic temporal versions: 30 Hz (RS1-30), 15 Hz, 7.5 Hz. The number of versions is chosen by the user at the time of encoding.

In the same way, it is possible to choose a certain number of spatial versions represented by RS2 and RS3. From the resolution RS1 (704×576 pixels), it is thus possible to construct the following lower spatial resolutions: RS2 (352×288 pixels), RS3 (176×144 pixels).

In the same way, the determination of the number of time versions takes place at the time of encoding.

The techniques used in SVC thus make possible to combine the spatial and temporal aspects in order to supply, for example, at the encoding level a 352×288 video at 7.5 Hz.

With reference to FIG. 3, the generation of the time versions for a given spatial resolution has been described.

FIG. 3 depicts schematically a tool for generating the time versions of a given spatial resolution. The tool used here is movement-compensated temporal filtering, also referred to as MCTF standing for "Motion Compensated Temporal Filtering" and widely known to persons skilled in the art. Other similar techniques known to persons skilled in the art could also be used for the construction of these temporal versions such as the technique of "hierarchical B images".

The general principle of MCTF filtering comprises two steps: prediction and updating. MCTF filtering is a multiresolution representation in a temporal dimension in a group of images. A transformation into wavelets in the temporal direction is carried out. Each decomposition stage consists of a high-pass filtering, then a low-pass filtering, of a group of images. The MCTF filtering therefore supplies a set of images of high-pass temporal detail $H_{n,y}$ and a set of low-pass approximation images $L_{n,x}$.

The succession of these levels (in the example in FIG. 3, the number of levels is equal to 4) or decomposition steps therefore supplies a multi-resolution representation in the temporal sense of the group of images considered. The step of generating the high-pass images is called prediction (prediction step), and the step of generating the low-pass images is called updating (update step). This method of filtering in wavelets is represented here by a "lifting" diagram well known to persons skilled in the art. This implementation makes it possible to perform the filtering operations in "place", that is to say the pixels processed replace the previous pixels in the various images. No additional memory is therefore necessary for carrying out filtering calculations.

With reference to FIG. 3, the original images of the group of digital images, also referred to as "Group Of Picture" (GOP), are depicted schematically by the notations 11 to 116. In FIG. 3 the image 10 is also depicted, which forms part of the previous group of images. It is used as a processing reference but is not modified.

In the prediction step (H), the odd images are first of all compensated for movement considering the future immediate image and the past immediate image. For example, for each block Bi of the image I1, the best block is sought in the images I0 and I2 which corresponds best according to a chosen error measurement. The MCTF filtering then consists of replacing the values of the block Bi with the error between the initial block Bi and the average of the two blocks retained in the images I0 and I2. In this way, on the whole of the group of images (GOP), the images $H_{1,i}$ represent error images after compensation of the movement made on all the blocks of the odd images. These error images, considered here to be output images, with respect to the original images, are then coded.

Next, it is the updating step (L). In this step, the even images are also filtered by block. The blocks corresponding according to the reverse movement compensation serve for filtering for the updating step. The images thus updated can be assimilated to an average of the original images on a given time window. The images thus updated correspond to the images $L_{1,2i}$. It should be noted that their temporal frequency is divided by two compared with the original images.

A new iteration of the MCTF filtering process can then be performed on the preceding images $L_{1,i}$, which are considered here to be intermediate images with respect to the original images and to the output images in order to obtain new temporal versions. It is possible to continue thus until a single image $L_{4,16}$ is obtained as illustrated in FIG. 3.

In the prior art (FIG. 4A), the images are processed by temporal level N by storing the 16 images of the group of images (GOP) from the start. This means that the images $L1$, and $H_{1,i}$ are processed first (level N=1), and then the images $L_{2,i}$ and $H_{2,i}$ (level N=2) and so on.

The output images are thus generated in a conventional manner by temporal level N:
 level N=4: L4,0; L4,16; H4,8.
 level N=3: H3,4; H3,12;
 level N=2: H2,2; H2,6;H2,10;H2,14;
 level N=1: H1,1; H1,3; H1,5; H1,7; H1,9; H1,11; H1,13; H1,15.

According to the invention, the processing of the various temporal versions of the group of images (GOP) is, unlike the prior art, carried out simultaneously so that the necessary number of images in the memory is minimal.

Thus, in the example presented, it is possible to use only 8 images in memory in order to produce the various temporal versions of this sequence having groups of images (GOP) of 16 images. It is therefore possible to optimize the memory in order to process a group of images.

This has the consequence of processing the images in a first particular order (here R1 to R16, FIG. 4B) in order to minimize the memory. The recommended processing order at the encoding level is that represented by the references R attached to the images (ranging in an increasing fashion from R1 to R17, FIG. 4B). The consequence of this sequencing R is to make processing operations mixing the images of the various temporal hierarchy levels N. The principle is to commence the processing operations as quickly as possible as soon as an image of a lower level is available in order to reduce the use of memory. For example, as illustrated in FIG. 3, as soon as images H1,1 H1,3 and H1,5 of the hierarchy level N=1, are available, it is possible to proceed with the generation of the upward image H2,2 of the hierarchy level N=2.

One of the advantages of the processing order R proposed is the possibility of commencing the image coding steps before ending the process of generating the various temporal versions. This makes it possible to reduce the time between the input of the images in the coder and the output of the images thus-coded.

As explained above in one example, the filtering is carried out on all the blocks of the image I1 and the corresponding blocks in the image I0 and in the image I2 in the sense of movement compensation. In order to be able to release memory as quickly as possible, the filtering operation for a given image is broken down into two steps which are referred to as the "left-hand side" and "right-hand side" in the above operations. Thus, taking the example of the filtering of the image I1, first of all the filtering operations are performed only with the image I0 ("left-hand side"): the result of the filtering is put in the image I1 and secondly the image I1 ("right-hand side") is filtered once again with the image I2, the final result of which is put in the image I1. It is in the rest of the processing that the separation into two steps and the processing of the images in a certain order makes it possible to minimize the memory space required for processing a group of images (GOP).

In order to better understand the diagram in FIG. 3, a list is given below of the various operations of filtering and writing in the buffer.

This list of operations also gives the input and output movements of the images in this buffer as well as the change in its size.

Input image [0] in buffer—Memory size: 1 image
Input image [1] in buffer—Memory size: 2 images
   1: level n=1—filtering of I1 with I0 (left-hand side)
Input image [2] in buffer—Memory size: 3 images
   2: level n=1—filtering of I1 with I2 (right-hand side)
Input image [3] in buffer—Memory size: 4 images
   3: level n=1—filtering of I3 with I2 (left-hand side)
   4: level n=1—filtering of I2 with I1 (left-hand side)
Output image [1] from buffer—Memory size: 3 images
Input image [4] in buffer—Memory size: 4 images
   5: level n=1—filtering of I3 with I4 (right-hand side)
   6: level n=1—filtering of I2 with I3 (right-hand side)
   7: level n=2—filtering of I2 with I0 (left-hand side)
Input image [5] in buffer—Memory size: 5 images
   8: level n=1—filtering of I5 with I4 (left-hand side)
   9: level n=1—filtering of I4 with I3 (left-hand side)
Output image [3] from buffer—Memory size: 4 images
Input image [6] in buffer—Memory size: 5 images
10: level n=1—filtering of I5 with I6 (right-hand side)
11: level n=1—filtering of I4 with I5 (right-hand side)
12: level n=2—filtering of I2 with I4 (right-hand side)
Input image [7] in buffer—Memory size: 6 images
13: level n=1—filtering of I7 with I6 (left-hand side)
14: level n=1—filtering of I6 with I5 (left-hand side)
Output image [5] from buffer—Memory size: 5 images
Input image [8] in buffer—Memory size: 6 images
15: level n=1—filtering of I7 with I8 (right-hand side)
16: level n=1—filtering of I6 with I7 (right-hand side)
17: level n=2—filtering of I6 with I4 (left-hand side)
18: level n=2—filtering of I4 with I2 (left-hand side)
Output image [2] from buffer—Memory size: 5 images
Input image [9] in buffer—Memory size: 6 images
19: level n=1—filtering of I9 with I8 (left-hand side)
20: level n=1—filtering of I8 with I7 (left-hand side)
Output image [7] from buffer—Memory size: 5 images
Input image [10] in buffer—Memory size: 6 images
21: level n=1—filtering of I9 with I10 (right-hand side)
22: level n=1—filtering of I8 with I9 (right-hand side)
23: level n=2—filtering of I6 with I8 (right-hand side)
24: level n=2—filtering of I4 with I6 (right-hand side)
25: level n=3—filtering of I4 with I0 (left-hand side)
Input image [11] in buffer—Memory size: 7 images
26: level n=1—filtering of I11 with I10 (left-hand side)
27: level n=1—filtering of I10 with I9 (left-hand side)
Output image [9] from buffer—Memory size: 6 images
Input image [12] in buffer—Memory size: 7 images
28: level n=1—filtering of I11 with I12 (right-hand side)
29: level n=1—filtering of I10 with I11 (right-hand side)
30: level n=2—filtering of I10 with I8 (left-hand side)
31: level n=2—filtering of I8 with I6 (left-hand side)
Output image [6] from buffer—Memory size: 6 images
Input image [13] in buffer—Memory size: 7 images
32: level n=1—filtering of I13 with I12 (left-hand side)
33: level n=1—filtering of I12 with I11 (left-hand side)
Output image [11] from buffer—Memory size: 6 images
Input image [14] in buffer—Memory size: 7 images
34: level n=1—filtering of I13 with I14 (right-hand side)
35: level n=1—filtering of I12 with I13 (right-hand side)
36: level n=2—filtering of I10 with I12 (right-hand side)
37: level n=2—filtering of I8 with I10 (right-hand side)
38: level n=3—filtering of I4 with I8 (right-hand side)
Input image [15] in buffer—Memory size: 8 images
39: level n=1—filtering of I15 with I14 (left-hand side)
40: level n=1—filtering of I14 with I13 (left-hand side)
Output image [13] from buffer—Memory size: 7 images
Input image [16] in buffer—Memory size: 8 images
41: level n=1—filtering of I15 with I16 (right-hand side)
42: level n=1—filtering of I14 with I15 (right-hand side)
43: level n=2—filtering of I14 with I12 (left-hand side)
44: level n=2—filtering of I12 with I10 (left-hand side)
Output image [10] from buffer—Memory size: 7 images
45: level n=1—filtering of I16 with I15 (left-hand side)
Output image [15] from buffer—Memory size: 6 images
46: level n=2—filtering of I14 with I16 (right-hand side)
47: level n=2—filtering of I12 with I14 (right-hand side)
48: level n=3—filtering of I12 with I8 (left-hand side)
49: level n=3—filtering of I8 with I4 (left-hand side)
Output image [4] from buffer—Memory size: 5 images
50: level n=2—filtering of I16 with I14 (left-hand side)
Output image [14] from buffer—Memory size: 4 images
51: level n=3—filtering of I12 with I16 (right-hand side)
52: level n=3—filtering of I8 with I12 (right-hand side)
53: level n=4—filtering of I8 with I0 (left-hand side)
54: level n=3—filtering of I16 with I12 (left-hand side)
Output image [12] from buffer—Memory size: 3 images
55: level n=4—filtering of I8 with I16 (right-hand side)
Output image [0] from buffer—Memory size: 2 images
56: level n=4—filtering of I16 with I8 (left-hand side)
Output image [8] from buffer—Memory size: 1 image
Output image [16] from buffer—Memory size: 0 images FIGS. 4A and 4B illustrate two orders of arrangement of the video bit stream. The first arrangement order, FIG. 4A, is that conventionally supplied by an SVC coder of the prior art.

As seen previously, the order as described with reference to FIG. 4A shows that, in the prior art, each temporal level N is processed independently, one after the other, which requires the storage of all of the images in the group of images (GOP).

The second arrangement order R ranging from R1 to R17 (stored by increasing order), FIG. 4B, is that supplied by the method according to the invention as described with reference to FIG. 3. The output images of the temporal levels N are intermingled as follows: R1=H1,1; R2=H1,3; R3=H1,5; R4=H2,2; R5=H1,7; R6=H1,9; R7=H2,6; R8=H1,11; R9=H1,13; R10=H2,10; R11=H3,4; R12=H1,15; R13=H2,14; R15=L4,0; R16=H4,8; R17=L4,16.

As it is necessary to have certain images of the lower level in order to encode an image of the higher level, the method consists of generating the images as soon as the necessary images (intermediate or output) of the lower level are processed and therefore available to be processed once again.

After generation of the temporal output images, all that there then remains to do is to encode these images.

Figure 5:
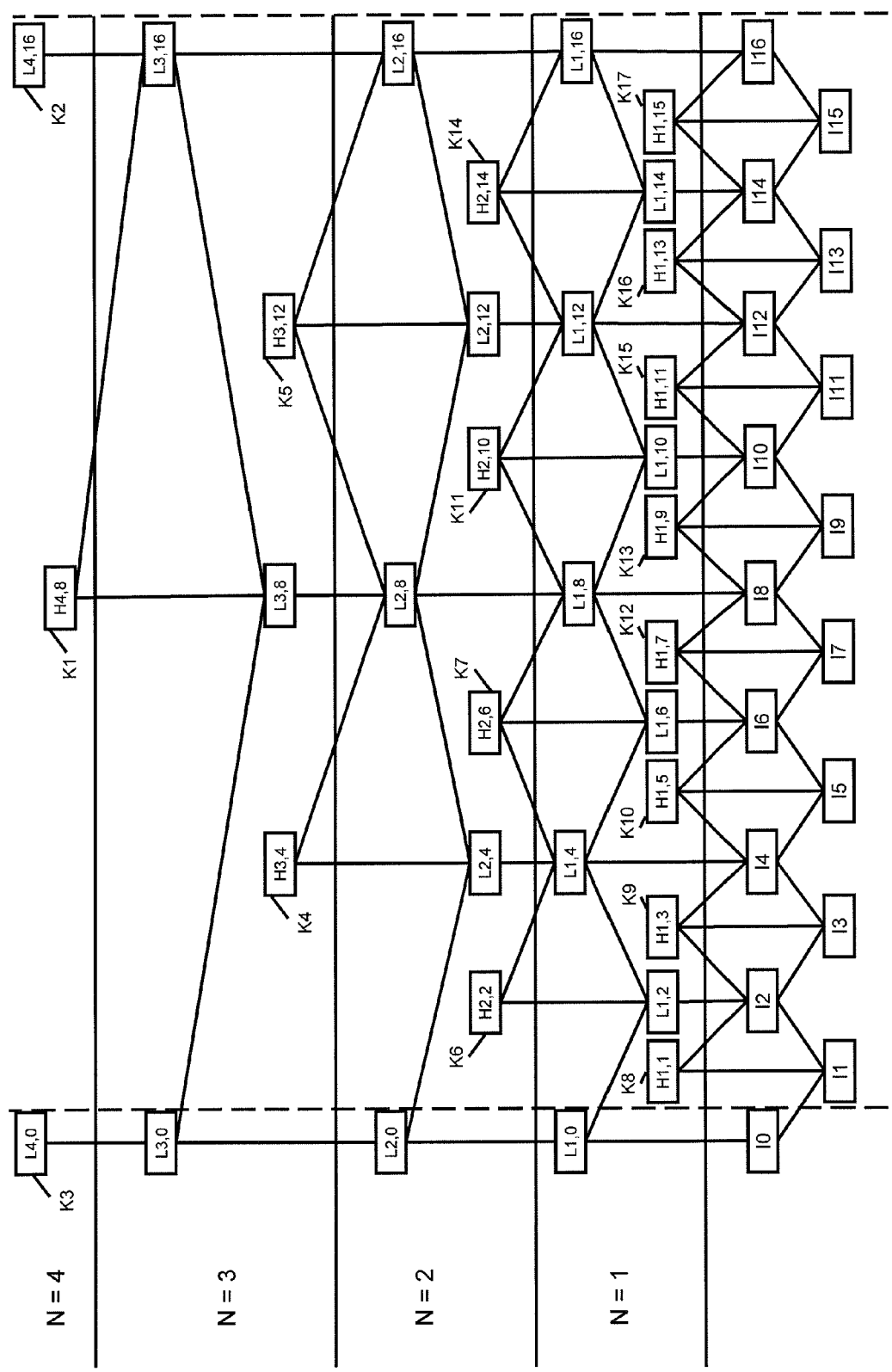
FIG. 5 illustrates the temporal filtering technique compensated for reverse movement implemented at the level of the decoding according to the invention.

With reference to FIG. 5, the reverse MCTF transformation at the decoding level has been illustrated. The reverse MCTF transformation consists of applying the reverse process to the direct MCTF transformation. The reverse filtering operations are then undertaken on the decoded images. The first step consists of performing the reverse updating operation, and then the reverse prediction operation.

In the same way as the method described with reference to FIG. 3, it is possible to minimize the useful memory in order to carry out the reverse processing in order to restore the various temporal versions. The consequence of this is processing the images at the decoder in a particular order in order to satisfy this constraint. The principle consists of processing the images as soon as possible as at the encoder.

For this purpose, the processing order indicated by the references K attached to the images in FIG. 5 ranging from K1 to K17 represents the best order for generating the decoded images. The order K corresponds to the following images; K1=L4,16; K2=H4,8; K3=L40; K4=H3,4; K5=H3,12; K6=H2,2; K7=H2,6; K8=H1,1; K9=H1,3; K10=H1,5; K11=H2,10; K12=H1,7; K13=H1,9;K14=H2,14; K15=H1, 11;K16=H1,13;K17=H1,15.

It should be noted that this second decoding order K does not correspond to the output order of the encoded images. There then exist at least two possibilities for ordering the video bit stream emerging from the coder so that its order is adapted to the optimum order for decoding. This sequencing corresponds to step E5 of FIG. 1.

According to the first possibility, the images encoded at the encoder are stored in their compressed form. Thus, as soon as possible, an operation of sequencing the images is undertaken in order to generate the order of the images corresponding to the decoder. The succession of images in the video bit stream is then in accordance with the decoding order.

According to the second possibility, the images in the video bit stream are organized as the coder supplies them. A buffer at the decoder makes it possible to arrange them in advance in the recommended order for decoding.

In the same way as for the coder, a separation of the filtering operations into two steps is made. It is the separation into two steps and the processing in a particular order of the images that makes it possible to minimize the size of the buffer.

The actions which specify the operations of filtration and movement in memory for the reverse MCTF transformation are listed below:
Input image [16] in buffer—Memory size: 1 image
Input image [8] in buffer—Memory size: 2 images
   1: level n=4—filtering of I16 avec I8 (left-hand side)
Input image [0] in buffer—Memory size: 3 images
   2: level n=4—filtering of I8 with I0 (left-hand side)
   3: level n=4—filtering of I8 with I16 (right-hand side)
Input image [4] in buffer—Memory size: 4 images
   4: level n=3—filtering of I8 with I4 (left-hand side)
   5: level n=3—filtering of I4 with I0 (left-hand side)
Input image [12] in buffer—Memory size: 5 images
   6: level n=3—filtering of I8 with I12 (right-hand side)
   7: level n=3—filtering of I4 with I8 (right-hand side)
Input image [2] in buffer—Memory size: 6 images
   8: level n=2—filtering of I4 with I2 (left-hand side)
   9: level n=2—filtering of I2 with I0 (left-hand side)
Input image [6] in buffer—Memory size: 7 images
10: level n=2—filtering of I4 with I6 (right-hand side)
11: level n=2—filtering of I2 with I4 (right-hand side)
Input image [1] in buffer—Memory size: 8 images
12: level n=1—filtering of I2 with I1 (left-hand side)
13: level n=1—filtering of I1 with I0 (left-hand side)
Output image [0] from the buffer—Memory size: 7 images
Input image [3] in buffer—Memory size: 8 images
14: level n=1—filtering of I2 with I3 (right-hand side)
15: level n=1—filtering of I1 with I2 (right-hand side)
Output image [1] from the buffer—Memory size: 7 images
16: level n=3—filtering of I16 with I12 (left-hand side)
17: level n=3—filtering of I12 with I8 (left-hand side)
18: level n=2—filtering of I8 with I6 (left-hand side)
19: level n=2—filtering of I6 with I4 (left-hand side)
20: level n=1—filtering of I4 with I3 (left-hand side)
21: level n=1—filtering of I3 with I2 (left-hand side)
Output image [2] from the buffer—Memory size: 6 images
Input image [5] in buffer—Memory size: 7 images
22: level n=1—filtering of I4 with I5 (right-hand side)
23: level n=1—filtering of I3 with I4 (right-hand side)
Output image [3] from the buffer—Memory size: 6 images
Input image [10] in buffer—Memory size: 7 images
24: level n=2—filtering of I8 with I10 (right-hand side)
25: level n=2—filtering of I6 with I8 (right-hand side)
26: level n=1—filtering of I6 with I5 (left-hand side)
27: level n=1—filtering of I5 with I4 (left-hand side)
Output image [4] from the buffer—Memory size: 6 images
Input image [7] in buffer—Memory size: 7 images
28: level n=1—filtering of I6 with I7 (right-hand side)
29: level n=1—filtering of I5 with I6 (right-hand side)
Output image [5] from the buffer—Memory size: 6 images
30: level n=3—filtering of I12 with I16 (right-hand side)
31: level n=2—filtering of I12 with I10 (left-hand side)
32: level n=2—filtering of I10 with I8 (left-hand side)
33: level n=1—filtering of I8 with I7 (left-hand side)
34: level n=1—filtering of I7 with I6 (left-hand side)
Output image [6] from the buffer—Memory size: 5 images
Input image [9] in buffer—Memory size: 6 images
35: level n=1—filtering of I8 with I9 (right-hand side)
36: level n=1—filtering of I7 with I8 (right-hand side)
Output image [7] from the buffer—Memory size: 5 images
Input image [14] in buffer—Memory size: 6 images
37: level n=2—filtering of I12 with I14 (right-hand side)
38: level n=2—filtering of I10 with I12 (right-hand side)
39: level n=1—filtering of I10 with I9 (left-hand side)
40: level n=1—filtering of I9 with I8 (left-hand side)
Output image [8] from the buffer—Memory size: 5 images
Input image [11] in buffer—Memory size: 6 images
41: level n=1—filtering of I10 with I11 (right-hand side)
42: level n=1—filtering of I9 with I10 (right-hand side)
Output image [9] from the buffer—Memory size: 5 images
43: level n=2—filtering of I16 with I14 (left-hand side)
44: level n=2—filtering of I14 with I12 (left-hand side)
45: level n=1—filtering of I12 with I11 (left-hand side)
46: level n=1—filtering of I11 with I10 (left-hand side)
Output image [10] from the buffer—Memory size: 4 images
Input image [13] in buffer—Memory size: 5 images
47: level n=1—filtering of I12 with I13 (right-hand side)
48: level n=1—filtering of I11 with I12 (right-hand side)
Output image [11] from the buffer—Memory size: 4 images
49: level n=2—filtering of I14 with I16 (right-hand side)
50: level n=1—filtering of I14 with I13 (left-hand side)
51: level n=1—filtering of I13 with I12 (left-hand side)
Output image [12] from the buffer—Memory size: 3 images
Input image [15] in buffer—Memory size: 4 images
52: level n=1—filtering of I14 with I15 (right-hand side)
53: level n=1—filtering of I13 with I14 (right-hand side)
Output image [13] from the buffer—Memory size: 3 images
54: level n=1—filtering of I16 with I15 (left-hand side)
55: level n=1—filtering of I15 with I14 (left-hand side)

Figure 6:
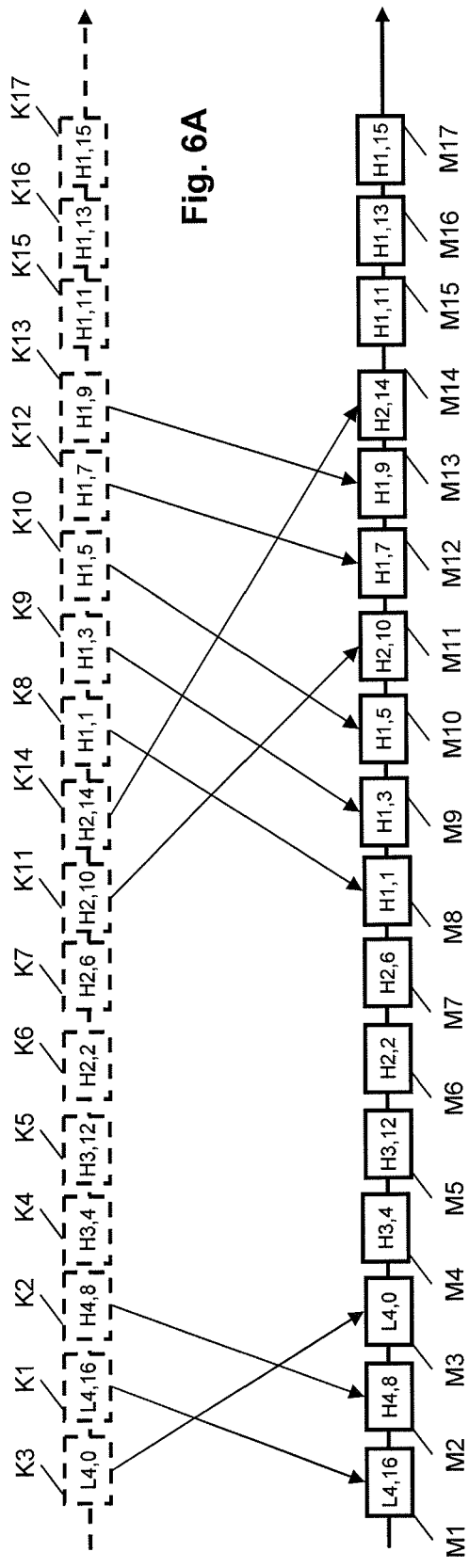
FIGS. 6A and 6B depict respectively the order K of the images at the encoding level and the order M of the images necessary at the decoding level according to the invention.

Output image [I4] from the buffer—Memory size: 2 images
56: level n=1—filtering of I15 with I16 (right-hand side)
Output image [I5] from the buffer—Memory size: 1 image
Output image [I6] from the buffer—Memory size: 0 image With reference to FIGS. 6A and 6B, the order K ranging from K1 to K17 and not stored by increasing order of the images at the encoding level (FIG. 6A) and the order M ranging M1 to M17 stored by increasing order of the necessary images at the decoding level (FIG. 6B) have been shown. The order M corresponds to the following images: M1=L4,16; M2=H4,8; M3=L4,0; M4=H3,4; M5=H3,12; M6=H2,2; M7=H2,6; M8=H1,1; M9=H1,3; M10=H1,5; M11=H2,10; M12=H1,7; M13=H1,9; M14=H2,14; M15=H1,11; M16=H1,13; M17=H1,15.

The arrows represent here the modification to the order of the images to be made at the level of the video bit stream during the reorganization step E5 described with reference to FIG. 1 in order to pass from order K to order M according to the invention.

Figure 7:
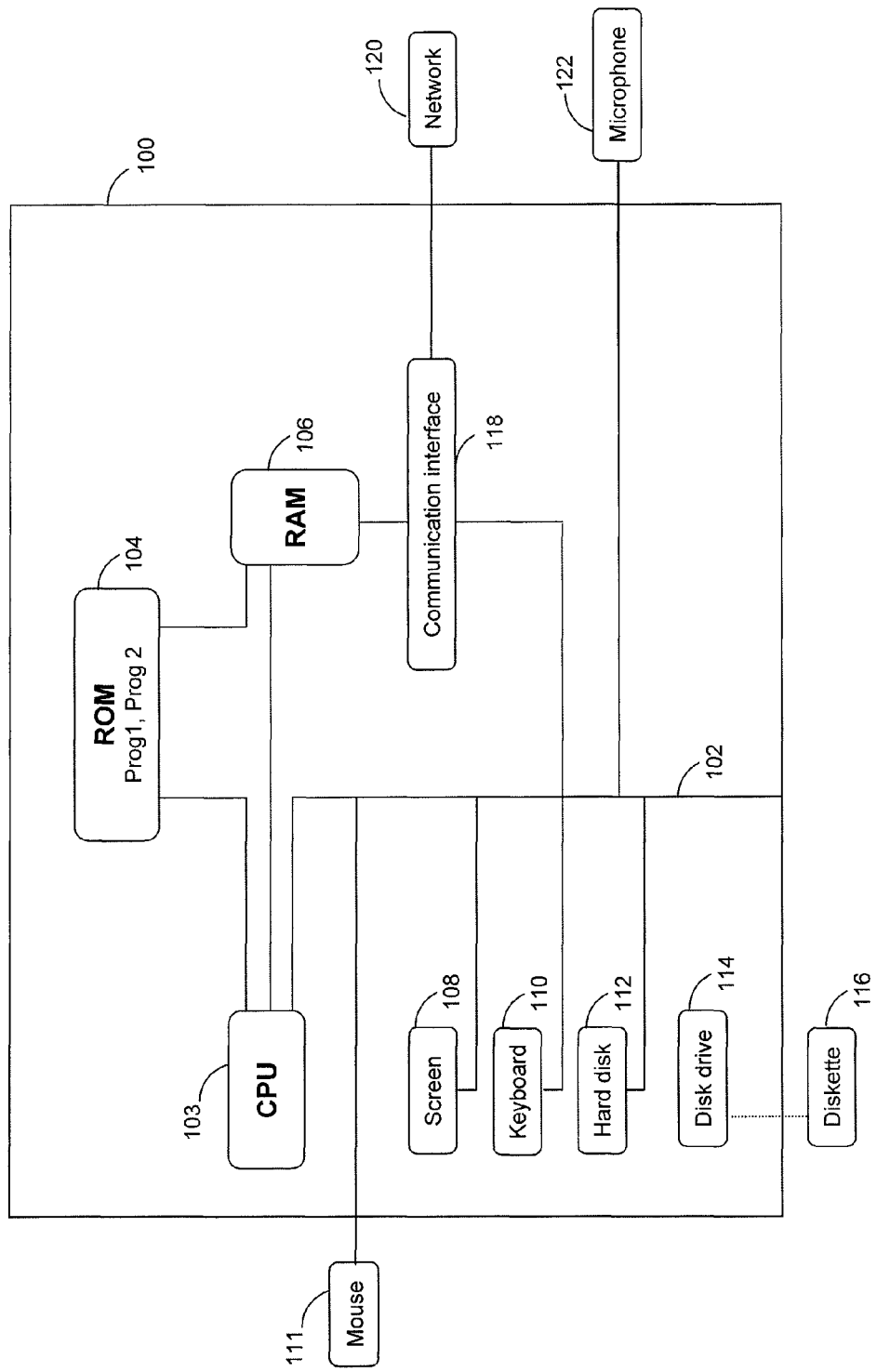
FIG. 7 depicts schematically the elements of the device for implementing the method according to the invention.

With reference to FIG. 7, the essential means constituting a device for implementing the processing methods according to the invention have been shown. The device is for example a microcomputer 100 connected to various peripherals, for example a digital camera 101 (or a scanner, or any image acquisition or storage means) connected to a graphics card and supplying information to be compressed according to the invention. The device 100 comprises a communication interface 118 connected to a network 120 able to transmit digital data to be compressed or to transmit data compressed by the device. The device 100 also comprises a storage means 112 such as for example a hard disk. It also comprises a disk drive 114. The diskette 116 like the disk 112 may contain compressed data according to the invention as well as the code of the invention which, once read by the device 100, will be stored on the hard disk 112.

According to a variant, the program (Prog1 or Prog2) enabling the device to implement the invention can be stored in read-only memory 104 (referred to as ROM in the drawing).

In a second variant, the program can be received in order to be stored in an identical fashion to that described previously by means of the communication network 120. The device 100 is connected to a microphone 122. The data to be transmitted according to the invention will in this case be of the audio signal. This same device has a screen 108 for displaying the data to be compressed or decompressed or to serve as an interface with the user, who will be able to parameterise certain options of the compression format for example, using the keyboard 110 or any other means (a mouse for example). The central unit 103 (referred to as CPU in the drawing) will execute the instructions relating to the implementation of the invention, instructions stored in the read-only memory 104 or in the other storage elements. On powering up, the compression and/or decompression programs stored in a non-volatile memory, for example the ROM 104, are transferred into the random access memory RAM 106, which will then contain the executable code of the invention as well as registers for storing the variables necessary for implementing the invention. Naturally, the diskettes can be replaced by any information medium such as a CD-ROM or memory card. In more general terms, an information storage means, able to be read by a computer or by a microprocessor, integrated or not into the device, possibly removable, stores a program implementing the processing method for the decoding or decoding according to the invention. The communication bus 102 allows communication between the various elements included in the microcomputer 100 or connected to it.

The representation of the bus 102 is not limiting and in particular the central unit 103 is capable of communicating instructions to any element of the microcomputer 100 directly or by means of another element of the microcomputer 100.

The invention claimed is:

1. A method of processing a sequence of digital images during a coding process to provide a bit stream comprising compressed output images of at least two temporal hierarchy levels in accordance with a predetermined scalable format, wherein at least one output image of a higher temporal hierarchy level is computed using a transformation comprising a temporal prediction and filtering process with respect to at least one output image of a lower temporal hierarchy level, the method comprising:

obtaining and storing original images; and
generating output images, by the transformation of original images and/or intermediate images based on the original images, and/or output images,
wherein the step of generating output images comprises reorganizing the order of said images for transformation in a first chosen order according to the output image which they are used to generate, enabling generation of said output image by the transformation as soon as the image or images of the lower temporal hierarchy level necessary for its generation are available and before transformation of the next images in said first chosen order for a next output image, so that the number of images to be stored simultaneously in a memory buffer, necessary for transformation by the transformation of the original images into output images, is minimal, said first chosen order being such that the processing intermingles images of different temporal hierarchy levels, the original images and/or intermediate images and/or output images being removed from the memory buffer as soon as the images are no longer necessary for any subsequent transformation by the transformation.

2. A method according to claim 1, wherein the method comprises, after the generation step, a step of coding the output images.

3. A method according to claim 2, wherein the step of coding the output images commences before the end of the step of obtaining all the original images of the sequence.

4. A method according to claim 1, wherein the method also comprises a step of sequencing the output images in a second chosen order.

5. A method according to claim 4, wherein the second chosen order is adapted to minimize the subsequent decoding time for the images.

6. A non-transitory computer-readable medium that can be read by a computer system, containing instructions of a computer program for implementing a method according to claim 1, when this program is loaded into and executed by the computer system.

7. A computer program stored on a non-transitory computer-readable medium, the program containing instructions for implementing a method according to claim 1, when this program is loaded into and executed by a computer system.

8. A method of processing a sequence of digital images during a decoding of a bit stream comprising compressed output images of at least two temporal hierarchy levels in accordance with a predetermined scalable format, wherein at least one output image of a higher temporal hierarchy level is computed using a transformation comprising a temporal prediction and filtering process with respect to at least one output image of a lower temporal hierarchy level, the method comprising:

decoding compressed output images according to said format and storing the output images thus decoded; and generating reconstructed images in the sequence of images, by a reverse transformation of decoded output images and/or intermediate images, and/or reconstructed images, wherein the reverse transformation corresponds to a reversed process of the transformation, and wherein the step of generating reconstructed images comprises reorganizing the processing order of images processed in a chosen order according to the output image which they are used to generate, enabling generation of said reconstructed image by the reverse transformation as soon as the image or images of the higher temporal hierarchy level necessary for its generation are available and before transformation of the next images in said chosen order for a next output image, so that the number of images to be stored simultaneously in a memory buffer, necessary for the reverse transformation of the output images into reconstructed images, is minimal, said chosen order being such that the processing intermingles images of different temporal hierarchy levels, the decoded output images and/or intermediate images and/or reconstructed images being removed from the memory buffer as soon as the images are no longer necessary for any subsequent transformation by the reverse transformation.

9. A method according to claim 8, wherein the method comprises a step of sequencing the compressed images according to a different chosen order.

10. A method according to claim 8, wherein the step of generating the reconstructed images commences before the end of the step of obtaining all the compressed output images.

11. A method according to claim 8, wherein the bit stream is coded according to the SVC format.

12. A device for processing a sequence of digital images during a coding process to provide a bit stream comprising compressed output images of at least two temporal hierarchy levels in accordance with a predetermined scalable format, wherein at least one output image of a higher temporal hierarchy level is computed using a transformation comprising a temporal prediction and filtering process with respect to at least one output image of a lower temporal hierarchy level, the device comprising:

means for obtaining and storing original images; and means for generating output images, by the transformation of original images and/or intermediate images based on the original images, and/or output images, wherein the means for generating output images comprises means for reorganizing the order of said images for transformation in a first order chosen, according to the output image which they are used to generate, enabling generation of said output image by the transformation as soon as the image or images of the lower temporal hierarchy level necessary for its generation are available and before transformation of the next images in said first order chosen, for a next output image, so that the number of images to be stored simultaneously in a memory buffer, necessary for transformation by the transformation of the original images into output images, is minimal, said first order chosen being such that the processing intermingles images of different temporal hierarchy levels, the original images and/or intermediate images and/or output images being removed from the memory buffer as soon as the images are no longer necessary for any subsequent transformation by the transformation.

13. A device according to claim 12, wherein said device further comprises means of coding the output images.

14. A device according to claim 12, wherein said device further comprises means of sequencing the output images in a second chosen order.

15. A device for processing a sequence of digital images during a decoding of a bit stream comprising compressed output images of at least two temporal hierarchy levels in accordance with a predetermined scalable format, wherein at least one output image of a higher temporal hierarchy level is computed using a transformation comprising a temporal prediction and filtering process with respect to at least one output image of a lower temporal hierarchy level, the device comprising:

means for decoding compressed output images according to said format and storing the output images thus decoded;

means for generating reconstructed images in the sequence of images, by a reverse transformation of decoded output images and/or intermediate images, and/or reconstructed images, wherein the reverse transformation corresponds to a reversed process of the transformation, and wherein the means for generating reconstructed images comprises means for reorganizing the processing order of images processed in a chosen order, according to the output image which they are used to generate, enabling generation of said output image by the reverse transformation as soon as the image or images of the higher temporal hierarchy level necessary for its generation are available and before transformation of the next images in said chosen order, for a next output image, so that the number of images to be stored simultaneously in a memory buffer, necessary for transformation by the reverse transformation of the output images into reconstructed images, is minimal, said chosen order being such that the processing intermingles images of different temporal hierarchy levels, the decoded output images and/or intermediate images and/or reconstructed images being removed from the memory buffer as soon as the images are no longer necessary for any subsequent transformation by the reverse transformation.

* * * * *